US008314179B2

(12) United States Patent  (10) Patent No.: US 8,314,179 B2
Iben et al.                (45) Date of Patent:    Nov. 20, 2012

(54) POLYMER MIXTURE

(75) Inventors: Dirk Iben, Sereetz (DE); Heino Koch, Alfeld (DE)

(73) Assignee: Benecke-Kaliko AG, Hannover (DE)

( * ) Notice: Subject to any disclaimer, the term of this patent is extended or adjusted under 35 U.S.C. 154(b) by 0 days.

(21) Appl. No.: 12/801,368

(22) Filed: Jun. 4, 2010

(65) Prior Publication Data

US 2010/0267861 A1    Oct. 21, 2010

Related U.S. Application Data

(63) Continuation of application No. PCT/EP2008/063504, filed on Oct. 9, 2008.

(30) Foreign Application Priority Data

Dec. 7, 2007 (DE) .................. 10 2007 059 090

(51) Int. Cl.
C08L 83/04 (2006.01)
C08L 83/08 (2006.01)
C08G 63/00 (2006.01)
C08G 71/04 (2006.01)

(52) U.S. Cl. .................. 524/588; 528/271; 528/422
(58) Field of Classification Search .................. 523/157; 524/591; 528/44

See application file for complete search history.

(56) References Cited

U.S. PATENT DOCUMENTS

| 3,449,281 A * | 6/1969 | Sullivan et al. ............... 428/391 |
| 3,567,499 A * | 3/1971 | Klebert et al. .................. 442/93 |
| 4,774,278 A * | 9/1988 | Yoshioka et al. ............. 524/506 |
| 4,933,237 A | 6/1990 | Krenceski et al. |
| 5,034,275 A | 7/1991 | Pearson et al. |
| 5,066,720 A * | 11/1991 | Ohsugi et al. .................. 525/100 |
| 5,075,370 A * | 12/1991 | Kubitza et al. ................ 524/591 |
| 5,268,215 A | 12/1993 | Krenceski et al. |
| 5,272,012 A | 12/1993 | Opolski |
| 5,331,039 A * | 7/1994 | Blum et al. .................... 524/507 |
| 5,521,247 A * | 5/1996 | Dobler et al. .................. 524/591 |
| 5,569,707 A * | 10/1996 | Blum et al. .................... 524/591 |
| 5,571,861 A * | 11/1996 | Klein et al. .................... 524/591 |
| 5,670,600 A * | 9/1997 | Nienhaus et al. ............... 528/75 |
| 5,750,234 A * | 5/1998 | Johnson et al. ............... 428/141 |
| 5,798,409 A | 8/1998 | Ho |
| 5,834,555 A * | 11/1998 | Meisenburg et al. .......... 524/591 |
| 6,013,364 A | 1/2000 | Terada et al. |
| 6,171,515 B1 * | 1/2001 | Evans et al. .................... 252/8.81 |
| 6,177,198 B1 * | 1/2001 | Schaefer ...................... 428/423.4 |
| 6,555,231 B2 * | 4/2003 | Doty et al. .................. 428/423.1 |
| 6,620,511 B1 * | 9/2003 | Wigger et al. ................ 428/413 |
| 6,624,234 B1 * | 9/2003 | Itakura et al. ................. 524/501 |
| 6,797,764 B2 * | 9/2004 | Sagiv et al. ................... 524/501 |
| 7,008,979 B2 * | 3/2006 | Schottman et al. ........... 523/334 |
| 7,022,760 B2 * | 4/2006 | Melchiors et al. ............ 524/553 |
| 7,205,356 B2 * | 4/2007 | Gürtler et al. ................. 524/590 |
| 7,427,641 B2 * | 9/2008 | Kataoka et al. .............. 523/160 |
| 7,538,154 B2 * | 5/2009 | Pohl et al. .................... 524/591 |
| 7,557,156 B2 * | 7/2009 | Muller et al. ................. 524/589 |
| 7,732,055 B2 * | 6/2010 | Niesten et al. ................ 428/447 |
| 2003/0138642 A1 * | 7/2003 | Kohler et al. ................. 428/447 |
| 2004/0018360 A1 * | 1/2004 | Hugo .......................... 428/411.1 |
| 2004/0167252 A1 * | 8/2004 | Melchiors et al. ............. 524/13 |
| 2004/0220326 A1 * | 11/2004 | Gurtler et al. ................. 524/589 |
| 2005/0020763 A1 * | 1/2005 | Milic ............................ 524/507 |
| 2005/0153068 A1 * | 7/2005 | Li et al. ........................ 427/180 |
| 2005/0182188 A1 * | 8/2005 | Rische et al. ................. 524/589 |
| 2005/0209399 A1 * | 9/2005 | Munzmay et al. ............ 524/589 |
| 2005/0222368 A1 * | 10/2005 | Reiners et al. ................. 528/73 |
| 2006/0084775 A1 * | 4/2006 | Rische et al. ................... 528/44 |
| 2007/0055016 A1 | 3/2007 | Niesten et al. |
| 2007/0232746 A1 * | 10/2007 | Swarup et al. ................ 524/500 |
| 2008/0035024 A1 * | 2/2008 | Munzmay et al. ....... 106/287.25 |
| 2008/0213600 A1 | 9/2008 | Biallas et al. |
| 2011/0288204 A1 * | 11/2011 | Grablowitz et al. .......... 523/402 |

FOREIGN PATENT DOCUMENTS

| DE | 10 2005 049 520 | 5/2006 |
| DE | 10 2005 049 521 | 5/2006 |
| EP | 0 596 932 | 5/1994 |
| WO | WO 2004/060949 | 7/2004 |

OTHER PUBLICATIONS

Product data sheet for Bayhydur 3100 from Bayer Material Science, 2009, 3 pages.*
Bieleman, Johan, "Polymere Lackadditive", Wiley-VCH, Weinheim, New York, 1998, pp. 396 to 412.

(Continued)

Primary Examiner — Robert S Loewe
(74) Attorney, Agent, or Firm — Ottesen P.A.

(57) ABSTRACT

The invention relates to a polymer mixture, especially for decorative surfaces in an automobile interior, that displays an improvement in long-term functionality with respect to the properties of writing sensitivity, soiling and cleaning behavior, abrasion resistance, and antisqueak behavior, both in the delivery condition and in the used condition. The inventive polymer mixture comprises: 0%-50% by weight of at least one aqueous polyurethane dispersion and/or polyester dispersion and/or polyether dispersion and/or polyester-polyacrylate dispersion and/or polyacrylate-polyurethane dispersion and/or polyacrylate dispersion and/or of a dispersion based on at least one of these and/or several other polymers; 1%-60% by weight of at least one aqueous polyurethane dispersion and/or polyesterpolyol dispersion and/or polyetherpolyol dispersion and/or polyacrylatepolyol dispersion and/or of a dispersion based on at least one of these and/or two or more other polymers, the polymer or at least one polymer being functionalized with OH groups and/or NH groups and possessing an OH content or NH content of between 0.3% and 6.0% by weight, based on the nonvolatile fraction of the total amount of the polymers; 0%-40% by weight of at least one nonfunctionalized slip additive; 1%-40% by weight of at least one functionalized slip additive; 0.2%-50% by weight of at least one crosslinker or crosslinker system; 0%-75% by weight of at least one matting agent; 0%-50% by weight of diluent; 0%-50% by weight of other adjuvants, based on the nonvolatile fraction of the total amount of polymers.

16 Claims, No Drawings

OTHER PUBLICATIONS

Büchner, W. et al., "Industrielle Anorganische Chemie", Verlag Chemie, Weinheim, Chapter 4 ff., 1986, pp. 299 to 317.

Jahncke, M. et al., "Dekorative Oberflächen aus Pasten PVC für den Automobilinnenraum", SKZ-Fachtagung "PVC-Pasten", Sep. 19/20, 2007, Süddeutsches Kunststoff-Zentrum, Würzburg, 2007.

Kittel, H., "Lehrbuch der Lacke und Beschichtungen", vol. 4 (Solvents, Plasticizers, Additives), edited by Martina Oertelt, 2nd edition, S. Hirzel 35 Verlag, Stuttgart 2007, ISBN 978-3-7776-1014-6 (title page only attached).

Stoye, D. et al., "Lackharze", Carl Hanser Verlag Munich Vienna, chapter 9 ff., 1996, pp. 337 to 357.

* cited by examiner

POLYMER MIXTURE

CROSS REFERENCE TO RELATED APPLICATIONS

This application is a continuation application of international patent application PCT/EP 2008/063504, filed Oct. 9, 2008, designating the United States and claiming priority from German application 10 2007 059 090.5, filed Dec. 7, 2007, and the entire content of both applications is incorporated herein by reference.

FIELD OF THE INVENTION

The invention relates to a polymer mixture, especially for decorative surfaces in an automobile interior.

BACKGROUND OF THE INVENTION

Decorative surfaces for shaped parts composed of a plastics material provided with a foil are widely known. The base material used is preferably a plastics material which is composed of a polymer mixture based on polyvinyl chloride (PVC), more particularly, plasticized PVC, polyurethane (PU), polyolefin, polyester (PES), acrylonitrile-butadiene-styrene copolymer (ABS), polymethyl methacrylate, poly carbonate, polyacrylate or copolymers. Here, for example, the following reference may be consulted for further reference: "Jahnke, Manfred; Mielke, Dirk; Van Well, Michael: Dekorative Oberflächen aus Pasten PVC für den Automobilinnenraum. [Decorative Surfaces of Paste PVC for the Automobile Interior]-In: SKZ-Fachtagung "PVC-Pasten", Sep. 19/20, 2007, Süddeutsches Kunststoff-Zentrum, Würzburg, 2007".

On the decorative surface, the polymer mixture is used preferably as a topcoat and/or varnish coat for the decorative surface; the varnish coat may be composed of one or more, identical or different, polymer mixtures. For adjusting the friction behavior, the sensorial properties, particularly the feel, the rheology, the matting behavior, and the light stability and heat stability, the polymer mixture is admixed with various crosslinker components, matting agents, and additives, also referred to as other adjuvants.

From the polymer mixtures known to date for decorative surfaces there are two significant disadvantages, that arise:

I. The level of the surface properties of decorative surfaces, preferably in the automobile interior, with regard to the properties of writing sensitivity, soiling and cleaning behavior, and abrasion resistance, all in all, in the delivery condition, does not meet the requirements of the present market.

II. In the installed condition, these decorative surfaces are subject to ongoing wear through use. In this condition of severe use exposure, the decorative surfaces coated with the existing polymer mixtures exhibit a significant deterioration in their writing sensitivity, soiling and cleaning behavior, abrasion resistance, and antisqueak behavior, as compared with the delivery condition. This is not in line with the requirements of the market.

The publications below are acknowledged as prior art in relation to existing polymer mixtures, preferably for decorative surfaces: German patent publication 10 2005 049 521 A1; German patent publication 10 2005 049 520 A1; German patent publication 10 2005 020 605 A1; U.S. Pat. Nos. 6,013,364; 5,034,275; 4,933,237; European patent publication 0 596 932; and, U.S. Pat. No. 5,268,215.

German patent publications 10 2005 049 521 A1, 10 2005 049 520 A1 and 10 2005 020 605 A1 disclose processes for preparing free-radically crosslinkable coating materials. The coating material in these cases comprises one or more oligo- and/or one or more polyurethane (meth)acrylates and a free-radically crosslinkable component which contains carbamate and/or biuret and/or allophanate and/or urea and/or amide groups, or a free-radically crosslinkable component, which has structural elements that form hydrogen bonds.

U.S. Pat. No. 6,013,364 describes a method of reforming a plastic article to provide it with a leatherlike touch. The two-phase PU paint used in this case is a solvent-based polyester-polyol system comprising polyester-polyol, having an average molecular weight of between 1000 to 5000 and a hydroxyl value of between 60 to 200, and hexamethylene diisocyanate.

A water-based polyurethane system composed of a copolymer containing unsaturated carboxylic acid groups, on a polyester support foil, is known from U.S. Pat. Nos. 5,034,275 and 4,933,237. The polyurethane in U.S. Pat. No. 4,933,237 derives from a polyurethane prepolymer whose chain contains aliphatic polyamines, and whose chain ends are N-methylol-hydrazide groups.

European patent publication 0 596 932 discloses a scratch-resistant polymer composition which comprises at least 50% by weight of a propylene block copolymer with randomly distributed ethylene/propylene components, 15%-30% by weight of a platelet-shaped inorganic filler, 0.5%-5% by weight of a polyorganosiloxane, and 0.1%-2% by weight of an epoxy resin.

U.S. Pat. No. 5,268,215 discloses a clearcoat coating which is composed of a reaction product of polyisocyanate and reactive polydialkylsiloxane.

SUMMARY OF THE INVENTION

As already stated, the polymer compositions disclosed in the cited publications no longer meet the requirements of the present market. The present invention has the objective of providing a polymer mixture, more particularly for use as decorative surfaces in an automobile interior, which displays an improvement in long-term functionality with respect to the properties of writing sensitivity, soiling and cleaning behavior, abrasion resistance, and antisqueak behavior, both in the delivery condition and in the used condition.

DESCRIPTION OF THE PREFERRED EMBODIMENTS OF THE INVENTION

This object is achieved by the polymer mixture of the type stated above having the following composition:

0%-50% by weight of at least one aqueous polyurethane dispersion and/or polyester dispersion and/or polyether dispersion and/or polyester-polyacrylate dispersion and/or polyacrylate-polyurethane dispersion and/or polyacrylate dispersion and/or of a dispersion based on at least one of these and/or several other polymers;

1%-60% by weight of at least one aqueous polyurethane dispersion and/or polyesterpolyol dispersion and/or polyetherpolyol dispersion and/or polyacrylatepolyol dispersion and/or of a dispersion based on at least one of these and/or several other polymers, the polymer or at least one polymer being functionalized with OH groups and/or NH groups and possessing an OH content or NH content of between 0.3% and 6.0% by weight, based on the nonvolatile fraction of the total amount of the polymers;

0%-40% by weight of at least one nonfunctionalized slip additive;

1%-40% by weight of at least one functionalized slip additive;
0.2%-50% by weight of at least one crosslinker or crosslinker system;
0%-75% by weight of at least one matting agent;
0%-50% by weight of diluent;
0%-50% by weight of other adjuvants, based on the nonvolatile fraction of the total amount of polymers.

The figures in % by weight that are used in this specification refer in every case to the as supplied form of the mixture component in question.

Surprisingly, it has been found that, through the combination of the above-described polymer system, particularly in conjunction with at least one functionalized slip additive, it is possible to achieve an improvement in long-term functionality, preferably of decorative surfaces in an automobile interior.

As a result, it becomes possible to meet the requirements of the market and to improve the required properties, such as writing sensitivity, soiling and cleaning behavior, abrasion resistance, and antisqueak behavior, not only upon delivery, but especially also under use.

The polymer mixture comprises 0%-50%, at least 0.1%, more particularly at least 0.5%, by weight of at least one aqueous polyurethane dispersion and/or polyester dispersion and/or polyether dispersion and/or polyester-polyacrylate dispersion and/or polyacrylatepolyurethane dispersion and/or polyacrylate dispersion and/or of a dispersion based on at least one of these and/or several other polymers. Optionally, the dispersions can comprise at least one silicone as an additional component, the term silicone being used in this specification in the manner described, for example, in W. Buchner et al., "Industrielle Anorganische Chemie", Verlag Chemie, Weinheim, chapter 4 ff., 1986, or in D. Stoye and W. Freitag: "Lackharze", Carl Hanser Verlag Munich Vienna, chapter 9 ff., 1996. The polymer mixture preferably comprises an aqueous polyurethane dispersion, which with particular preference is high-molecular and aliphatic. High-molecular, in this context, means that the polyurethane possesses more than 10 monomer units.

Furthermore, the polymer mixture comprises 1%-60%, preferably 2.5%-40%, and more preferably 5%-30% by weight of at least one aqueous polyurethane dispersion and/or polyesterpolyol dispersion and/or polyetherpolyol dispersion and/or polyacrylatepolyol dispersion and/or a dispersion based on at least one of these and/or several other polymers, the polymer or at least one polymer being functionalized with OH groups and/or NH groups and possessing an OH content and/or NH content of between 0.3% and 6.0% by weight, based on the nonvolatile fraction of the total amount of the polymers. Optionally, the dispersions may comprise, as an additional constituent, at least one silicone.

The polymer mixture preferably comprises an aqueous polyurethane dispersion functionalized with OH groups, the amount of OH groups being between 0.3% and 6.0%, preferably between 0.5% and 5.0%, more preferably between 0.7% and 4.8%, by weight, based on the nonvolatile fraction of the polymer. The polymer mixture further comprises 0%-40%, preferably 0%-30%, more preferably 0%-20%, and, in turn, more preferably 0%-10%, but at least 0.1%, more particularly at least 0.5%, by weight of at least one nonfunctionalized slip additive.

The nonfunctionalized slip additive comprises a polydialkylsiloxane and/or polydimethylsiloxane (PDMS) and/or modified polysiloxanes and/or branched polyorganosiloxanes and/or polyolefinic waxes and/or polyamide waxes and/or polytetrafluoroethylene (PTFE) and/or alternating ethylene-chloro-tri-fluoroethylene copolymers (ECTFE) and/or perfluorinated alkoxyl resins (PFA) and/or natural waxes, such as carnauba waxes, for example. It is preferred, though, for the nonfunctionalized slip additive to be a polydimethylsiloxane and to have between 10 and 14 000 D-silicone structural units.

The inventive polymer mixture comprises 1%-40%, preferably 1%-30%, more preferably 1%-20%, and, in turn, more preferably 1%-10%, by weight, of at least one functionalized slip additive, in which case a functionalized and modified polysiloxane slip additive is preferred.

The functionalized slip additive is modified with primary and/or secondary and/or tertiary amino groups and/or OH groups.

The functionalized slip additive has an amine number of between 0.1 and 3.0 mg KOH/g and/or an OH content of between 0.3% and 5.0% by weight.

The total amount of nonfunctionalized slip additive and functionalized slip additive is 1%-40%, preferably 5%-25%, by weight, based in each case on the nonvolatile fraction of the total amount of the slip additives to the nonvolatile fraction of the total amount of all the constituents of the polymer mixture.

The polymer mixture comprises 0.2%-50% by weight of at least one crosslinker or crosslinker system.

The crosslinker or crosslinker system of the polymer mixture is based on polyisocyanate and/or polyepoxide and/or epoxysilane and/or alkoxymethylmelamine and/or urea resin and/or based on polycarbodiimide and/or polyaziridine with a polyisocyanate basis being preferred.

Where the polyisocyanate constitutes the basis of the crosslinker or crosslinker system, the polyisocyanate has an NCO fraction of between 5% and 30%, preferably between 7% and 25%, by weight. The polyisocyanate here has a crosslinking ratio of NCO to OH of between 1.0 and 15.0, preferably between 1.0 and 10.0, and/or a crosslinking ratio of NCO to $NH_xR_{3-x}$, of between 1.0 and 5.0, where x can adopt a value between 0.1 and 2.9.

The polyisocyanate can be a hexamethylene diisocyanate (HDI) and/or an isophorone diisocyanate (IPDI) and/or a 4,4'-dicyclohexylmethane diisocyanate ($H_{12}$MDI) and/or a hexahydrotolylene diisocyanate ($H_6$TDI), it being possible for each of these polyisocyanates to be present in the form of a biuret or uretdione or allophanate or isocyanurate or iminooxadiazinedione.

The NCO content of the polymer mixture crosslinked by the crosslinker or by the crosslinker system is between 0.2% and 9.0%, preferably between 0.3% and 8.0%.

Modes of crosslinking that are contemplated for the crosslinking include all those known to the skilled person. Examples given here include chemical and/or physical crosslinking modes, such as amine crosslinking, aziridine crosslinking, carbodiimide crosslinking, enamine crosslinking, epoxide crosslinking, epoxysilane crosslinking, urea crosslinking, hydrazide crosslinking; melamine crosslinking or oxidative drying. Consideration may also be given to self-crosslinking systems, such as azomethine crosslinking, a carbonyl-amine reaction taking place by evaporation of the neutralizing agent and of the water, autooxidation or UV-aqueous. Further possible crosslinking modes are silane crosslinking and/or radiation crosslinking, by UV radiation, for example. Equally possible is dual-cure crosslinking, i.e., a combination of the polyurethane chemistry and of the UV crosslinking chemistry.

The polymer mixture further comprises 0%-75%, preferably 0%-50%, at least 0.1%, more particularly at least 0.5%, by weight of at least one matting agent, the matting agent being based on an aqueous polyurethane dispersion and/or producing matting on the basis of polymer-organic compounds.

In the polymer mixture there is 0%-50%, at least 0.1%, more particularly at least 0.5%, by weight of diluent present, it being possible for the diluent to be in the form of a mixture of water and 2-propanol in varying weight proportions.

Other adjuvants are present in the polymer mixture in amounts of 0%-50%, preferably in amounts of 0%-45%, more preferably in amounts of 0%-35%, at least in amounts of 0.1%, more preferably at least in amounts of 0.5%, by weight. These adjuvants are selected from the group consisting of light stabilizers, such as UV absorbers and reversible free-radical scavengers, and/or antioxidants and/or wetting agents and/or substrate-wetting agents and/or emulsifiers and/or flow control agents and/or film-forming assistants and/or rheological assistants and/or flame retardants and/or biocides and/or neutralizing agents and/or defoamers and/or thickeners and/or inorganic fillers and/or organic fillers and/or pigments.

It is preferred for there to be 0%-25% by weight of organic fillers and/or inorganic fillers and/or pigments present.

In addition it is possible to use other adjuvants known to the skilled person. Textbooks describing these adjuvants include the following:

"Lackadditive" by Johann Bieleman, Wiley-VCH, Weinheim, New York 1998.

"Lehrbuch der Lacke and Beschichtungen", Volume 4 (Solvents, Plasticizers, Additives), edited by Martina Oertelt, 2nd edition, S. Hirzel 35 Verlag, Stuttgart 2007.

The inventive polymer mixture finds use as abrasion-resistant material, particularly in the form of a dashboard or interior trim component, more particularly of a seat covering material, for a vehicle. The mixture serves as a surface of an abrasion-resistant product, particularly in the form of a dashboard or of an interior trim component, more particularly of a seat covering material, for a vehicle.

Furthermore, the polymer mixture may be used as a coating material, in which case it may be used either as a single-coat or as a multicoat coating material. The resultant overall dry film thickness across all the coats is between 0.5 and 50 g/m², preferably between 1 and 35 g/m².

The polymer mixture will now be illustrated further with reference to a working example A, composed of a basecoat and a finish coat, and a reference sample R, composed of a basecoat and a finish coat, and corresponding test results, which are shown in Table 1.

WORKING EXAMPLE A

|  | % by weight |
|---|---|
| Basecoat: | |
| aqueous, aliphatic polyurethane dispersion | 50.0 |
| fumed silica | 5.0 |
| diluent (2-propanol/water 50/50) | 28.6 |
| defoamer | 0.4 |
| substrate-wetting agent | 0.4 |
| nonfunctionalized slip additive | 3.4 |
| functionalized slip additive | 6.0 |
| crosslinker (HDI isocyanurate, 17.4% NCO) | 6.2 |
| Finish Coat: | |
| aqueous, aliphatic polyurethane dispersion, 1.5% OH content | 13.7 |
| aqueous, aliphatic polyurethane dispersion, with polymer-organic matting | 42.7 |
| diluent (2-propanol/water 50/50) | 28.0 |
| dimethylaminoethanol | 0.2 |
| defoamer | 2.0 |
| substrate-wetting agent | 0.7 |
| nonfunctionalized slip additive (PDMS) | 3.1 |
| functionalized, modified polysiloxane slip additive (amine number 0.6 mg KOH/g) | 5.5 |
| thickener | 3.0 |
| crosslinker (HDI isocyanurate, 17.4% NCO) | 7.2 |
| Resultant overall dry film thickness: | | basecoat 7 g/m² + finish coat 8.5 g/m²

REFERENCE SAMPLE R

|  | % by weight |
|---|---|
| Basecoat: | |
| aqueous, aliphatic polyurethane dispersion | 38.5 |
| matting batch (2-propanol/water/fumed silica) | 30.1 |
| diluent (2-propanol/water 50/50) | 7.6 |
| dimethylaminoethanol | 0.2 |
| defoamer | 0.3 |
| substrate-wetting agent | 0.3 |
| thickener | 4.2 |
| water | 18.2 |
| crosslinker (HDI isocyanurate, 17.4% NCO) | 0.6 |
| Finish Coat: | |
| aqueous, aliphatic polyurethane dispersion | 15.3 |
| aqueous, aliphatic polyurethane dispersion, with polymer-organic matting | 46.9 |
| diluent (2-propanol/water 50/50) | 15.5 |
| dimethylaminoethanol | 0.1 |
| defoamer | 0.7 |
| substrate-wetting agent | 0.7 |
| nonfunctionalized slip additive (PDMS) | 5.0 |
| functionalized, modified polysiloxane slip additive (amine number 0.6 mg KOH/g) | 9.0 |
| thickener | 1.3 |
| crosslinker (HDI isocyanurate, 17.4% NCO) | 1.1 |
| crosslinker (HDI iminooxadiazinedione, 23.5% NCO) | 4.5 |
| Resultant overall dry film thickness: | | basecoat 7 g/m² + finish coat 3 g/m²

The table lists the corresponding DIN standards for the individual tests. The following tests were not carried out according to DIN standard, and are therefore described in detail.

Soiling behavior:

The procedure, i.e., the soiling, was performed in a method based on DIN EN ISO 12947-2.

The loading weight prescribed for the soiling test is 12 kPa over 5000 soiling turns without interruption. The soiled samples are removed from the sample holders and divided in halves, to allow half of the sample to be cleaned with a commercial interior cleaner. Assessment is made by colorimetry.

Fingernail stressing (fingernail test):

The test temperature is 23° C.

The test specimen is a plastic disk having a radius r=8 mm, a thickness d=1 mm, and a Shore A hardness of D85.

The test specimen is drawn by its narrow side over the sample with an applied pressing force of 15 N, 25 N and 30 N, at 15 cm/s.

A scratch track is a permanent, visible damage to the surface. A write track is a visible change to the surface, without damage.

Inverse Martindale:

The procedure is analogous to DIN EN ISO 12947-2, with the difference that the abradant is placed in the sample holder head, and the measurement sample is placed in the sample holder guide plate.

The entry OK denotes "satisfactory", i.e. there was no notable finding that occurred, i.e., no abrasion or scratching.

|  |  | A | R |
|---|---|---|---|
| Long-term flexing (Bally flexometer) | DIN 53351 lengthwise/crosswise) |  |  |
| 150,000 flexes | at RT | 0 | 0 |
| 20,000 flexes | after 1 cycle DIN EN ISO 105 B06, exposure condition 3 | 0 | 0 |
| 100,000 flexes | at RT; after 500 h 100° C. | 0 | 0 |
| 10,000 flexes | at −10° C.; after 500 h 100° C. | 0 | 0 |
| Martindale, 12 kPa | DIN EN ISO 12947-2 |  |  |
| 60,000 turns | with cleaning (water) | OK | incipient dish abrasion |
| 80,000 turns | with cleaning (water) | OK | dish abrasion |
| Polishability by inverse Martindale, 12 kPa | to DIN EN ISO 12947-2 (to DIN EN ISO 2813) |  |  |
| 60° gloss measurement (300 scale divisions [sd]) |  |  |  |
| unstressed |  | 2.0 sd | 2.0 sd |
| 25,000 turns |  | 2.4 sd | 2.6 sd |
| 100,000 turns |  | 2.8 sd | 5.4 sd |
| Veslic | DIN EN ISO 11640 (track) |  |  |
| dry | 500 rubs | OK | incipient coating abrasion |
|  | 2,000 rubs | OK | coating abrasion |
| wet | 500 rubs | OK | OK |
|  | 2,000 rubs | OK | OK |
| Frictional behavior to DIN EN ISO 8295 |  |  |  |
| static friction |  | 0.29 | 0.35 |
| sliding friction |  | 0.21 | 0.26 |
| slipstick (N) |  | — | — |
| Squeak behavior | VDA 230-206 Part 3 (draft) |  |  |
| Delivery | risk priority (RP) number | 1 | 1 |
| after 25,000 turns of inverse Martindale, 12 kPa | risk priority (RP) number | 1 | 7 |
| after 100,000 turns of inverse Martindale, 12 kPa | risk priority (RP) number | 8 | 8 |
| after hot storage 500 h 100° C. | risk priority (RP) number | 3 | 1 |
| Fingernail test |  |  |  |
| 25 N |  | OK | very slight write track |
| 30 N |  | OK | very slight write track |
| 25 N | after 500° C. 100° C. | slight write track | slight write track |
| Soiling behavior | Colorimetry (D65, 8° diffuse): ΔL* |  |  |
| Substrate in gray color | soiled | −0.94 | −1.41 |
|  | cleaned (BMW interior cleaner) | −0.23 | −0.31 |

An improvement in terms of the market requirement of long-term functionality, with regard to the properties of writing sensitivity, soiling and cleaning behavior, abrasion resistance, and antisqueak behavior, both in the delivery condition and in the used condition, is clearly apparent from working example A in comparison to a reference sample R.

It is understood that the foregoing description is that of the preferred embodiments of the invention and that various changes and modifications may be made thereto without departing from the spirit and scope of the invention as defined in the appended claims.

What is claimed is:

1. A polymer mixture for decorative surfaces in an automobile interior, comprising:
    0.1%-50% by weight of a first aqueous polymer dispersion of a first polymer selected from the group consisting of a polyurethane, a polyester, a polyether, a polyester-polyacrylate, a polyacrylate-polyurethane, and a polyacrylate, or a mixture thereof,
    wherein the first polymer is aliphatic;
    1% -60% by weight of a second aqueous polymer dispersion of a second polymer selected from the group consisting of a polyurethane, a polyesterpolyol, and a polyetherpolyol, or a mixture thereof, the second polymer being functionalized with OH groups and/or NH groups and possessing an OH content or NH content of between 0.3% and 6.0% by weight, based on the nonvolatile fraction of the total amount of the second aqueous polymer dispersion;
    0.1%-40% by weight of polydimethylsiloxane;
    1%-40% by weight of a modified polysiloxane slip additive;
    0.2%-50% by weight of at least one crosslinker or crosslinker system;
    0.1% -75% by weight of at least one matting agent;
    0%-50% by weight of a diluent;
    0%-50% by weight of other adjuvants, based on the nonvolatile fraction of the total amount of polymer mixture,
    wherein the modified polysiloxane slip additive has an amine number of between 0.1 and 3.0 mg KOH/g and/or an OH content of between 0.3% and 5.0% by weight.

2. The polymer mixture of claim 1, wherein the second aqueous polymer is functionalized with OH groups.

3. The polymer mixture of claim 1, wherein the modified polysiloxane slip additive is modified with primary and/or secondary and/or tertiary amino groups and/or OH groups.

4. The polymer mixture of claim 1, wherein the total amount of polydimethylsiloxane and modified polysiloxane slip additive is 1.1%-40% by weight, based on the nonvolatile fraction of the total amount of the slip additives relative to the nonvolatile fraction of the total amount of all the constituents of the polymer mixture.

5. The polymer mixture of claim 1, wherein the crosslinker or the crosslinker system is based on at least one polyisocyanate and/or polyepoxide and/or epoxysilane and/or alkoxymethylamine and/or urea resin and/or is based on at least one polycarbodiimide and/or polyaziridine.

6. The polymer mixture of claim 1, wherein the crosslinker or the crosslinker system is based on a polyisocyanate.

7. The polymer mixture of claim 6, wherein the polyisocyanate has an NCO fraction of between 5% and 30% by weight.

8. An abrasion-resistant product having a surface comprising a polymer mixture of claim 1.

9. The abrasion-resistant product of claim 8 in the form of a dashboard or interior trim part for a vehicle.

10. The abrasion resistant product of claim 9, wherein the interior trim part is a seat covering material.

11. An abrasion-resistant material comprising the polymer mixture of claim 1.

12. The polymer mixture of claim 11 as abrasion resistant material for producing a dashboard or an interior trim part for a vehicle.

13. The polymer mixture of claim 12, wherein the abrasion resistant material is a seat covering material.

14. A coating material comprising the polymer mixture of claim 1.

15. The coating material of claim 14 as single-coat or multicoat coating material with a resultant overall dry film thickness of between 0.5 and 50 $g/m^2$.

16. The polymer mixture of claim 1, wherein the total amount of the polydimethylsiloxane and the modified polysiloxane slip additive is 5% to 25%, based on the nonvolatile fraction of the total amount of the slip additives relative to the nonvolatile fraction of the total amount of all the constituents of the polymer mixture.

* * * * *